United States Patent [19]

Bomio et al.

[11] 4,128,684
[45] Dec. 5, 1978

[54] METHOD OF PRODUCING A PACKING AND A PACKING LAYER MADE THEREBY

[75] Inventors: Pietro Bomio, Winterthur; Werner Meier, Elgg, both of Switzerland

[73] Assignee: Sulzer Brothers Limited, Winterthur, Switzerland

[21] Appl. No.: 739,047

[22] Filed: Nov. 5, 1976

Related U.S. Application Data

[63] Continuation of Ser. No. 593,381, Jul. 7, 1975, abandoned.

[30] Foreign Application Priority Data

Jul. 9, 1974 [CH] Switzerland ..................... 9404/74

[51] Int. Cl.² ............................................... B32B 1/00
[52] U.S. Cl. .............................. 428/175; 139/384 R; 139/420 R; 428/182; 428/246; 428/252; 428/253; 428/257; 428/258; 428/259
[58] Field of Search ............... 428/175, 182, 246, 252, 428/253, 257, 258, 259; 139/384 R, 420 R; 55/520, 521, 527

[56] References Cited

U.S. PATENT DOCUMENTS

| | | | |
|---|---|---|---|
| 2,627,644 | 2/1953 | Foster | 428/175 |
| 3,372,533 | 3/1968 | Rummel | 55/521 |
| 3,679,537 | 8/1968 | Huer et al. | 428/184 |
| 3,798,057 | 3/1974 | Polovino | 428/182 |
| 3,801,419 | 4/1974 | Meek | 428/184 |

*Primary Examiner*—James J. Bell
*Attorney, Agent, or Firm*—Kenyon & Kenyon, Reilly, Carr & Chapin

[57] ABSTRACT

The layers for the packing are each woven of thin multi-filament yarns and thicker plastic monofilament yarns with the thicker plastic yarns being heat treated into a deformed state to impart a corrugated shape to each layer. The monofilament yarns impart rigidity to the layers while the multi-filament yarns provide wetting characteristics. The layers may also be of knitted construction.

11 Claims, 7 Drawing Figures

METHOD OF PRODUCING A PACKING AND A PACKING LAYER MADE THEREBY

This is a continuaton of application Ser. No. 593,381 filed July 7, 1975 now abandoned.

This invention relates to a method of producing a packing and a packing layer made thereby. More particularly, this invention relates to a method of producing a packing layer which can be used in heat exchange equipment as well as in rectification equipment.

Heretofore, various types of packings have been known, for example for use in rectification equipment, heat exchange equipment, mixers and the like. Such packings have been described in U.S. Pat. Nos. 3,785,620 and 3,679,537. Generally, these packings have been constructed either entirely or partially of materials which are subject to corrosion when placed in use with various media. For example, in some instances, packings have been made in layers composed of a woven textile fabric with woven-in wires to stiffen the layers. However, apart from being subject to corrosion in certain environments, the layers of these packings have not been easily manipulated into the shapes desired for the packing layers.

Accordingly, it is an object of the invention to provide a packing layer made of non-corrosive material.

It is another object of the invention to provide a packing layer of textile sheet structure having good wetting properties and adequate stiffness.

Briefly, the invention provides a method of making a packing layer as well as a packing layer per se.

The method includes the steps of forming a sheet-like structure of thin multi-filament yarns and thicker plastic yarns, and thereafter permanently deforming at least the thicker plastic yarns to shape the structure into a layer to define a plurality of flow paths. The deformation step is advantageously effected by heat treatment. In addition, the layer can be deformed in a zig-zag manner to form a corrugated shape.

A plurality of such layers are brought together in layered fashion to define a packing having flow paths defined between the layers. These flow paths may be oriented in different fashions in order to permit use of the packing, for example in air cooling equipment or in rectification equipment.

The packing layer per se is in the form of a textile sheet-structure of thin multi-filament yarns and thicker plastic yarns at least some of the thicker yarns being permanently deformed to impart a corrugated self-supported shape to the structure. The term "textile sheet-structure" is used to denote woven and knitted fabrics and fleeces.

Since the textile sheet-structure contains thin multifilament yarns, the packing has good wetting properties while the thicker plastic yarns stiffen the individual layers and impart good stability of shape. Further, since the thicker stiffening filaments consist of plastic, the packing is also resistant to corrosion. The packing is also distinguished by having a low pressure drop.

A very advantageous packing produced by the method is characterised in that the layers consist of a woven fabric. In this packing, suitable selection of the thin multifilament yarns and of the mesh width give optimum wetting with adequate lateral liquid transport. This ensures uniform liquid distribution over the entire cross-section of the packing while the thicker plastic yarns, which can be woven in in the direction of the warp and/or weft, ensure good stability of the shape of the layers.

These and other objects and advantages of the invention will become more apparent from the following detailed description taken in conjunction with the accompanying drawings in which:

FIG. 1 diagrammatically illustrates a simplified textile structure for a packing in accordance with the invention;

Figure 1:
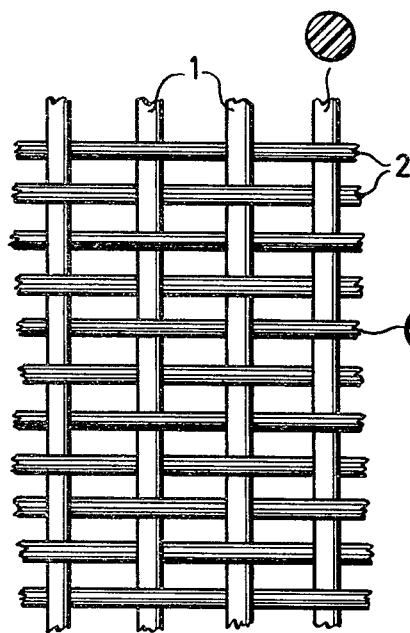

Referring to FIG. 1, the textile sheet-structure consists of a woven fabric in which only monofilament yarns 1 are provided in one direction while only thin multifilament yarns 2 are used in the other direction. The monofilament yarns 1 which are thicker than the multifilament yarns 2 consist of a thermally deformable plastics, for example polypropylene, and have a diameter of 0.1 to 1 millimeter for example. The term "thermally deformable" means that the thermoplastic yarns can be heated to their softening point at which the yarn can be deformed into another shape and then cooled so as to be set in the new shape. The monofilament yarns 1 are woven in at the same time as the fabric is produced. The multifilament yarn 2 is made from endless fibers or staple fibers and may consist of the same material as the monofilament yarns 1, i.e. polypropylene, or of another material, for example polyacrylonitrile.

Figure 2:
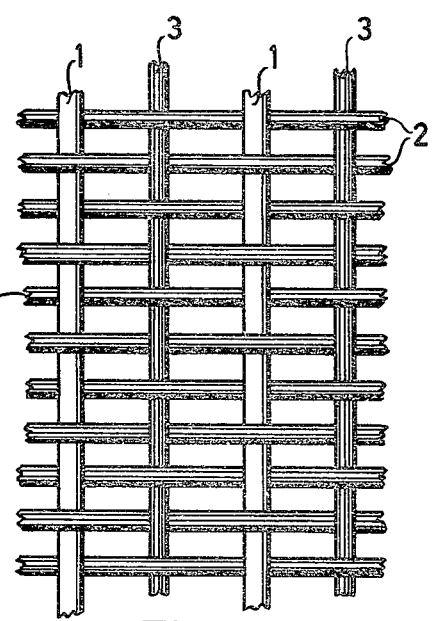
FIG. 2 illustrates a view similar to FIG. 1 of a modified textile structure having multi-filaments in both warp and weft directions, in accordance with the invention.

Referring to FIG. 2, the textile sheet-structure may also be formed with monofilament yarns 1 in one direction but, in this case, in alternation with thin multifilament yarns 3. Only multifilament yarns 2 are woven in the other (i.e. transverse) direction.

Figure 3:
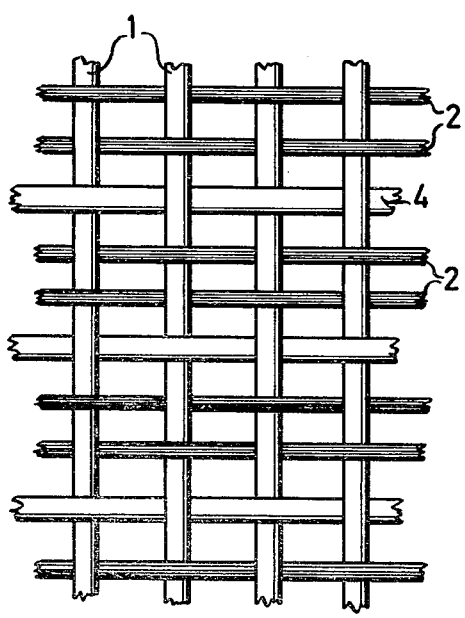
FIG. 3 illustrates a view similar to FIG. 1 of a further modified structure having monofilament plastic yarns in both warp and weft directions in accordance with the invention.

Referring to FIG. 3, the textile sheet-structure may also be formed with only monofilament yarns 1 extending in one direction of the fabric while thicker monofilament yarns 4 are incorporated together with thin multifilament yarns 2 in the other direction.

Figure 4:
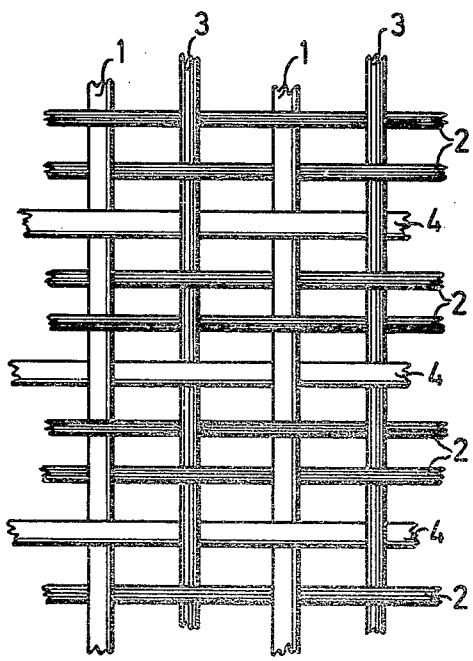
FIG. 4 illustrates a view similar to FIG. 1 of a further modified structure having multi-filament and monofilament yarns in both warp and weft directions in accordance with the invention.

Referring to FIG. 4, the textile sheet-structure may also be formed with monofilament yarns 1 and 4 which are woven in both directions and also thin multifilament yarns 2 and 3 in both directions.

Figure 5:
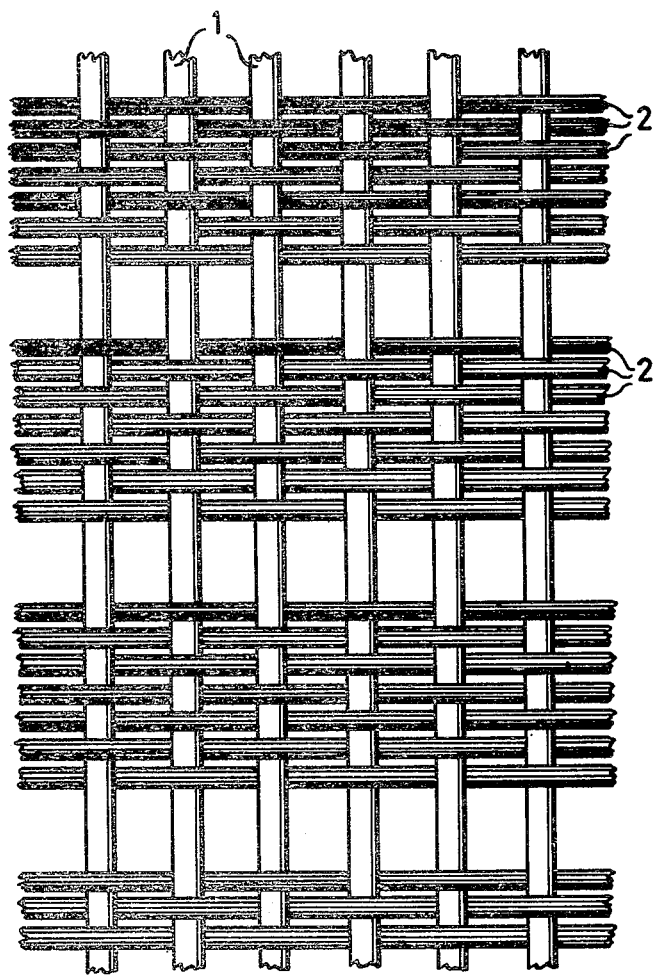
FIG. 5 illustrates a view of a textile structure having multi-filament yarns disposed in spaced apart groups in accordance with the invention.

Referring to FIG. 5, a fabric may be formed so as to consist solely of monofilament yarns 1 in one direction while a plurality of thin multifilament yarns 2 (for example five-ten) are woven close together in the other direction, a space or gap being left between each resulting group of multifilament yarns 2. However, monofilament yarns and multifilament yarns can be woven in in any desired proportions in both directions.

In order to form a packing, a textile sheet-structure, as above, of web form is cut into portions of a size required to form the shaped layers. The portions are then subjected to a heat treatment in which at least the thicker plastic yarns undergo permanent deformation and the portions are for example folded zig-zag into a corrugated shape. A heat treatment in which only the thicker plastic yarns are deformed is possible, for example, if the material used for the thicker plastic yarns has a lower softening point than the material of the thinner multifilament plastic yarns.

When both yarns consist of the same material, the thinner plastic yarn is also subjected to permanent deformation in the heat treatment. It is also possible for the textile web to be subjected to heat treatment first for deformation and then cut into portions of appropriate size.

Figure 6:
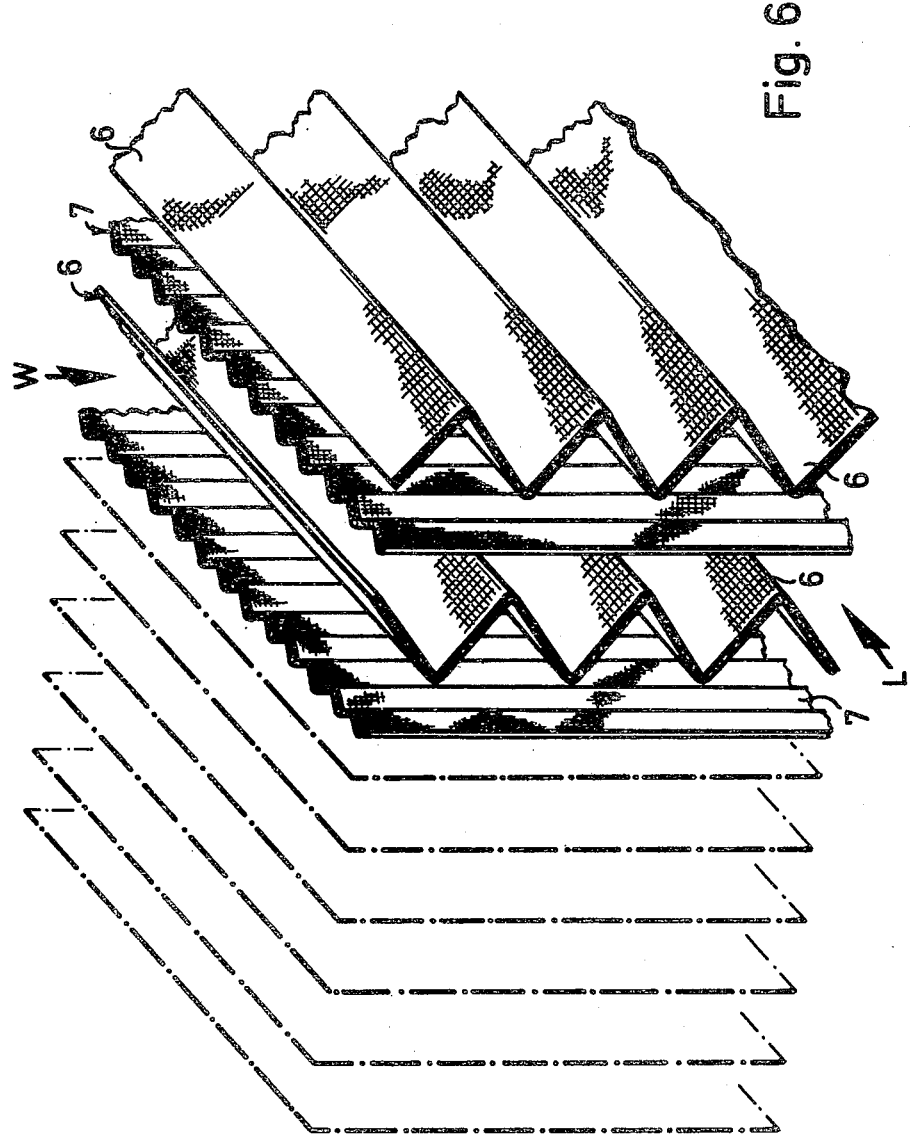
FIG. 6 illustrates an exploded view of a packing according to the invention for use in air cooling equipment.

Referring to FIG. 6, the textile sheet-structure can be used to form a packing for a cross-flow heat-exchanger of the kind advantageously used in air-conditioning. As shown, such a packing has individual layers 6, 7, formed respectively; with horizontal and vertical corrugations or zig-zag folds extending at right angles to the monofilament yarns 1. Each of these layers 6, 7 consists of a woven fabric having a monofilament and multifilament yarn structure as described in FIGS. 1 to 5. The folds of adjacent layers 6, 7 cross at an angle of about 90° and have point contact. The arrow W denotes the direction of flow of cooling water and arrow L, the direction of flow of air to be cooled. The packing formed from the layers 6, 7 has a square cross-section. One or more packings of this kind are fitted in known manner into a chamber provided with incoming and outgoing conduits for the cooling water and air.

Figure 7:
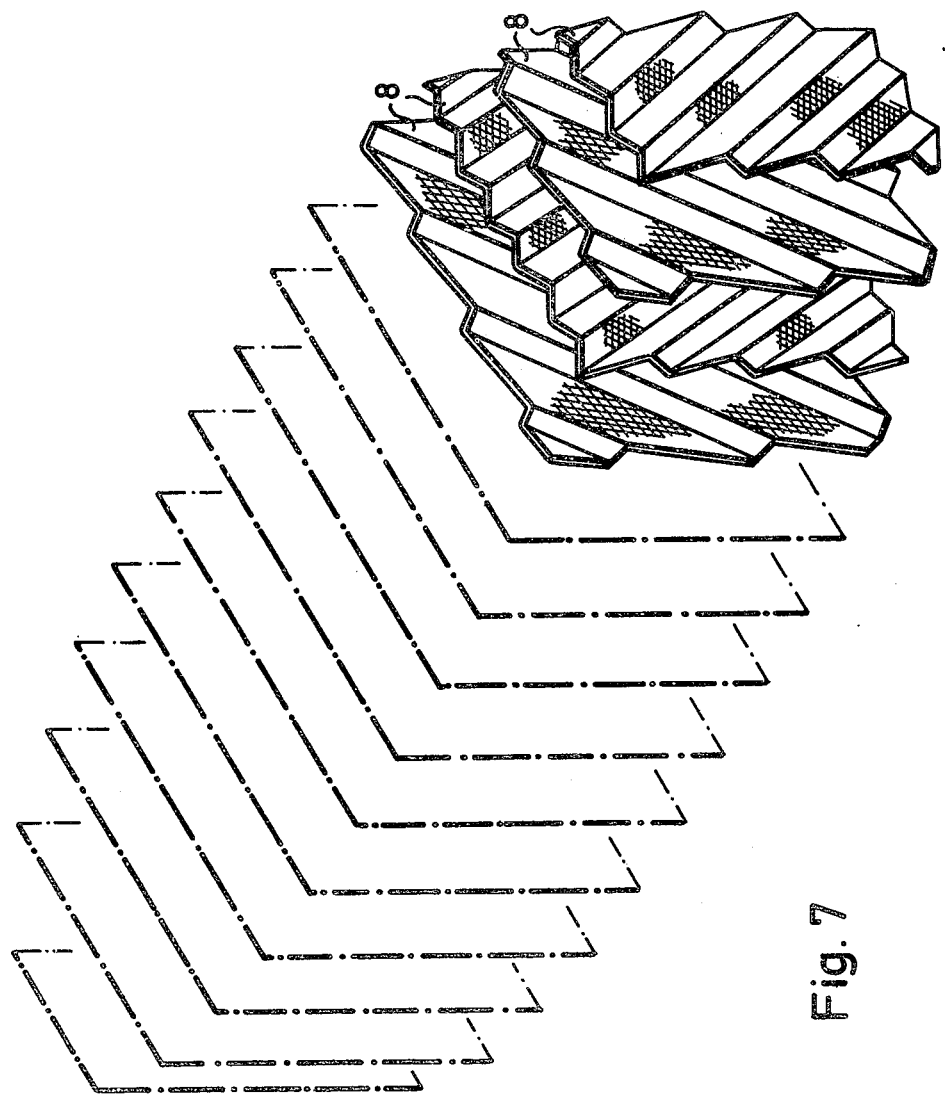
FIG. 7 illustrates an exploded view of a packing according to the invention for use in rectification equipment.

Referring to FIG. 7, a packing may also be formed for use in a material exchange column, for example a rectifying column having a substantially circular cross-section. In this case, the individual layers of the packing again consist of one of the fabrics described in FIGS. 1 to 5 and are provided with zig-zag folds as shown in the case of the front four layers in FIG. 7. The fold edges extend at an angle to the monofilament yarn 1 in this construction. The circular cross-section of the packing element results from the different dimensions of the layers, which increase towards the middle from both ends. The folds of adjacent layers cross one another so that flow ducts or paths form between the layers, with each flow path being uninterrupted and of constant dimension throughout (FIG. 6).

It is important that the thin multifilament yarns, which have good wetting properties, should extend substantially horizontally in the packings to ensure good distribution of the liquid transversely of the vertical direction of flow.

The textile sheet-structure is shaped into the shape of the layers in each case preferably by heat treatment. The thicker monofilament yarns impart a sufficient rigidity to stabilize the shape. If the thin multifilament yarns of the textile structures consist of a material having a higher softening point, the advantage obtained is that the fine fibers of the multifilament yarns are not destroyed by sticking together or fusing during the thermal deformation, so that the capillary action is retained over the entire length of the multifilament yarn.

The textile structures may alternatively be produced by knitting instead of by weaving, using monofilament yarns and multifilament yarns. In that case, the monofilament yarns give the required stiffness and the multifilament yarns give the required wetting properties.

The thin multifilament yarns may consist of glass fibers, natural fibers or asbestos fibers instead of plastic although the use of plastic filaments is the preferred embodiment.

What is claimed is:

1. A packing comprising a plurality of shaped layers of a textile sheet-structure, at least some of said layers defining flow ducts and at least some of said layers being formed of thin non-metallic multifilament yarns and thicker monofilament plastic yarns with at least some of said thicker plastic yarns being permanently deformed to impart a self-supported shape to said layers, each of said flow ducts of said deformed layers having a constant dimension throughout.

2. A packing as set forth in claim 1 wherein said structure is a woven structure of said yarns.

3. A packing as set forth in claim 1 wherein said structure is a woven structure with said yarns forming weft and warp yarns, and wherein at least one of said weft and warp yarns consist of alternating monofilament yarns and multifilament yarns.

4. A packing as set forth in claim 3 wherein said multifilament yarns and said monofilament yarns are woven in different proportions.

5. A packing as set forth in claim 2 which consists solely of monofilaments in one direction and solely of multifilaments in a transverse direction.

6. A packing as set forth in claim 2 wherein said yarns are made of the same plastic material.

7. A packing as set forth in claim 2 wherein said multi-filament yarns are made of a plastic material different from the plastic material of said monofilament yarns.

8. A packing as set forth in claim 1 wherein said deformed layers have zig-zag folds extending at an angle to said thicker plastic monofilaments.

9. A woven textile sheet-structure formed of thin non-metallic multifilament yarns and thicker monofilament plastic yarns with at least some of said thicker plastic yarns being permanently deformed to impart a corrugated self-supported shape to said structure to define uninterrupted flow ducts of constant dimension throughout.

10. A packing comprising a plurality of shaped layers of a textile sheet-structure, at least some of said layers defining flow ducts and at least some of said layers being formed of thin multi-filament yarns and thicker plastic yarns with at least some of said thicker plastic yarns being permanently deformed at the softening point by heat treatment to impart a shape of said layers each of said flow ducts of said deformed layers having a constant dimension throughout.

11. A method of making a layer for a multi-layered packing, said method including the steps of
forming a woven textile sheet structure of thin multifilament plastic yarns and thicker mono-filament plastic yarns, and
thereafter permanently mechanically deforming at least the thicker monofilament plastic yarns at the softening point by heat treatment to shape the textile structure into a self-supported layer folded in zig-zag manner and defining a plurality of flow paths, each said flow path having a constant dimension throughout.

* * * * *

UNITED STATES PATENT AND TRADEMARK OFFICE
CERTIFICATE OF CORRECTION

PATENT NO. : 4,128,684
DATED : December 5, 1978
INVENTOR(S) : Pietro Bomio Et Al It is certified that error appears in the above—identified patent and that said Letters Patent are hereby corrected as shown below:

Column 1, line 20, change "in" to --of--

Column 4, line 53, change "of" to --to--

Signed and Sealed this

Seventeenth Day of July 1979

[SEAL]

Attest:

LUTRELLE F. PARKER
*Attesting Officer*   *Acting Commissioner of Patents and Trademarks*